United States Patent
Green et al.

(10) Patent No.: US 9,858,414 B2
(45) Date of Patent: *Jan. 2, 2018

(54) DETECTING SCRIPT-BASED MALWARE USING EMULATION AND HEURISTICS

(71) Applicant: Microsoft Technology Licensing, LLC, Redmond, WA (US)

(72) Inventors: Jonathon Patrick Green, Melbourne (AU); Anjali Doulatram Chandnani, Melbourne (AU); Simon David Christensen, Melbourne (AU)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,090

(22) Filed: Mar. 10, 2015

(65) Prior Publication Data

US 2015/0310212 A1    Oct. 29, 2015

Related U.S. Application Data

(63) Continuation of application No. 13/085,937, filed on Apr. 13, 2011, now Pat. No. 8,997,233.

(51) Int. Cl.
*G08B 23/00*    (2006.01)
*G06F 11/30*    (2006.01)
*G06F 21/56*    (2013.01)
*H04L 29/06*    (2006.01)

(52) U.S. Cl.
CPC .......... *G06F 21/561* (2013.01); *G06F 21/566* (2013.01); *H04L 63/145* (2013.01)

(58) Field of Classification Search
CPC ..... G06F 21/561; G06F 21/566; H04L 63/145

USPC ............................................ 726/24; 713/188
See application file for complete search history.

(56) References Cited

U.S. PATENT DOCUMENTS

| | | | |
|---|---|---|---|
| 7,092,861 B1 | 8/2006 | Shteyn | |
| 7,636,945 B2* | 12/2009 | Chandnani | G06F 21/563 713/188 |
| 7,707,634 B2 | 4/2010 | Sandu et al. | |
| 7,739,100 B1 | 6/2010 | Muttik et al. | |
| 8,997,233 B2* | 3/2015 | Green | G06F 21/566 713/188 |
| 2006/0075500 A1* | 4/2006 | Bertman | G06F 21/563 726/24 |
| 2007/0156390 A1* | 7/2007 | Guenthner | G06F 9/45504 703/27 |
| 2008/0235764 A1* | 9/2008 | Cohen | G06F 21/6281 726/1 |

(Continued)

OTHER PUBLICATIONS

Min Feng and Rajiv Gupta, "Detecting Virus Mutations Via Dynamic Matching", 2009, Retrieved Date: Mar. 31, 2011, 10 pages.

(Continued)

*Primary Examiner* — Aravind Moorthy

(57) ABSTRACT

The subject disclosure is directed towards running script through a malware detection system including an emulator environment to detect any malware within the script. Statistics are collected as part of processing the script, with parameterized heuristic analysis used to determine whether to run the emulation. The processing through the malware detection system may be iterative, to de-obfuscate layers of obfuscated malware. The emulator may be updated via signatures.

20 Claims, 5 Drawing Sheets

(56) References Cited

U.S. PATENT DOCUMENTS

| | | | | |
|---|---|---|---|---|
| 2009/0077544 | A1* | 3/2009 | Wu | G06F 21/56 |
| | | | | 717/160 |
| 2010/0180344 | A1 | 7/2010 | Malyshev et al. | |
| 2010/0192224 | A1* | 7/2010 | Ferri | G06F 21/53 |
| | | | | 726/23 |
| 2011/0041179 | A1 | 2/2011 | Stahlberg | |
| 2011/0197272 | A1* | 8/2011 | Mony | G06F 21/566 |
| | | | | 726/12 |
| 2011/0247072 | A1* | 10/2011 | Staniford | H04L 63/1416 |
| | | | | 726/24 |

OTHER PUBLICATIONS

Bitdefender Active Virus Control, "Proactive Protection Against New and Emerging Threats", Retrieved Date: Mar. 31, 2011, 7 pages.

Min Gyung Kang, et al., "Emulating Emulation-Resistant Malware", VMSec '09, Published Date: Nov. 9, 2009, Chicago, Illinois, 12 pages.

Rajesh Mony, "High Speed JavaScript Sandbox", Webroot, Published Date: Oct. 13, 2010, 37 pages.

Xinran Wang, et al., "STILL: Exploit Code Detection via Static Taint and Initialization Analyses", 2008 Annual Computer Security Applications Conference, Published Date: 2008, 10 pages.

Deepak Venugopal and Guoning Hu, "Efficient Signature Based Malware Detection on Mobile Devices", Mobile Information Systems 4, Published Date: 2008, 17 pages.

U.S. Appl. No. 13/085,937, Non Final Office Action dated Nov. 15, 2012, 9 pages.

U.S. Appl. No. 13/085,937, Final Office Action dated May 23, 2013, 11 pages.

U.S. Appl. No. 13/085,937, Non Final Office Action dated Jul. 11, 2014, 9 pages.

U.S. Appl. No. 13/085,937, Notice of Allowance dated Nov. 26, 2014, 5 pages.

* cited by examiner

DETECTING SCRIPT-BASED MALWARE USING EMULATION AND HEURISTICS

CROSS-REFERENCE TO RELATED APPLICATIONS

This application is a continuation of U.S. application Ser. No. 13/085,937, filed Apr. 13, 2011, the entirety of which is hereby incorporated by reference herein.

BACKGROUND

Via the Internet, individuals and organizations with malicious intent distribute software that damages computer systems and/or is used to steal the personal information of users (including individual users or entities such as companies). Such malicious software, or malware, often exploits code vulnerabilities and/or gets installed onto users' computer systems by tricking users into taking some action.

To protect against malware, contemporary anti-malware software uses a variety of mechanisms to catch and quarantine malware, including by looking for patterns in the malware, referred to as signatures. One way malware authors try to avoid anti-malware detection is by obfuscating the underlying code and/or making it somewhat polymorphic so that its signature and behavior are not readily detectable (which can be somewhat considered "encrypted" to an extent).

Script-based malware, often found in browser content and in active content within files, is distributed in source form (e.g., as opposed to binary form). To avoid detection by antimalware scanners and increase the difficulty of manually researching malware samples, script-based malware is typically obfuscated and/or polymorphic. At the same time, it is impractical to author and distribute specific static signatures for all unique variants of obfuscated and/or polymorphic script-based malware.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which data corresponding to a script sample is processed in an emulation environment, including analyzing/interpreting structure and content of a data structure (e.g., a parsed program tree) corresponding to the script sample, and/or analyzing/interpreting events triggered during emulation, to match against generic and static signatures of malware.

In one aspect, whether to perform emulation in the emulation environment is based on a heuristic analysis of statistics collected from the script sample. To this end, statistics for the heuristic analysis may be generated via tokenization, normalization and parsing of the script sample, which may be performed as part of static signature matching.

In another aspect, content corresponding to the script sample may be placed into a sub-script, with the sub-script iteratively processed in the emulation environment. The sub-script may be further simplified and iteratively processed, and so on.

In other aspects, the runtime emulation environment is updatable via signatures, and/or the runtime emulation environment may be dynamically changed during the emulation. The statistics and/or heuristics rules may be updated during emulation-enabled run-time.

Parameters may be used to control the heuristic analysis of the statistics, as well as control the emulation. Example parameters include memory-related data, emulation instruction-related data (e.g., some maximum number of instructions to emulate), weight data for different heuristics, and/or triggering threshold data.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards script parsing and interpretation within a dynamic, emulated environment, coupled with heuristic analysis, to detect obfuscated and/or polymorphic scripts in a way that is effective against malicious attempts to evade detection by antimalware scanners. In general, the script (some or all, referred to herein as a script "sample") is processed into a more generic ("decrypted") version that can be scanned for generic malware signatures, referred to as generic detection. As a result, instead of needing individual signatures to detect a piece of malware that may be obfuscated in dozens of different ways (or even more), for example, the processing breaks down the obfuscated script into the underlying common code that is detectable by a smaller signature set, e.g., a single signature covers many variants.

In one aspect, the technology uses an emulator (a runtime emulation environment) to perform signature matching on a 'virtual file object' (VFO) that contains a script to be scanned for malware. As will be understood, different forms of the signature checks may be performed multiple times before, after and during successive iterations of processing, which may include tokenization, normalization, parsing and emulation/interpretation/de-obfuscation on the script sample.

It should be understood that any of the examples herein are non-limiting. For one, other antimalware mechanisms including non-script-based scanners may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and protection against malware in general.

Figure 1:
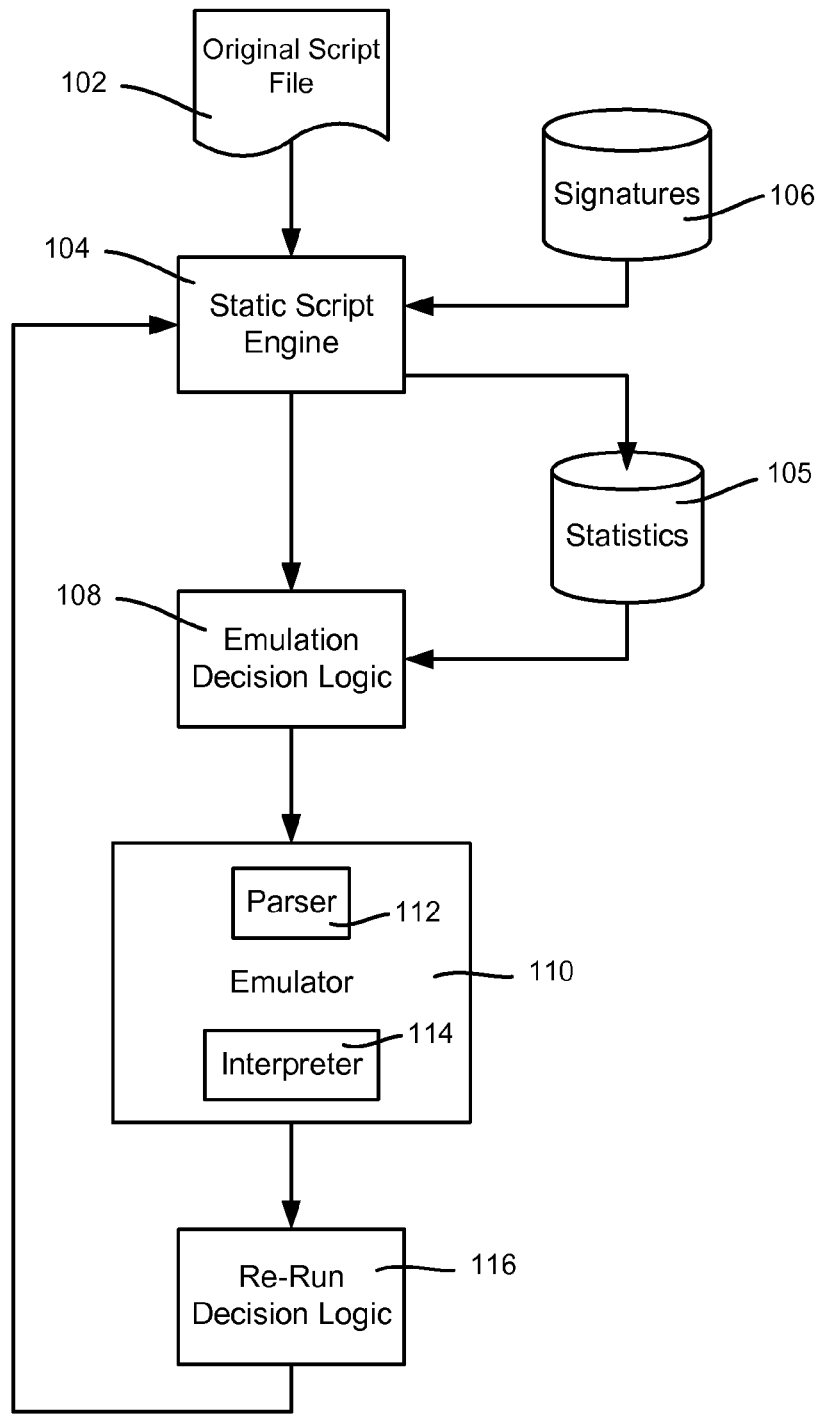
FIG. 1 is a block diagram representing example components for detecting script-based malware in a system that includes a runtime emulation environment.

FIG. 1 is a generalized block diagram showing example components for scanning a script file according to a multi-stage process described herein. An original source file 102 is processed by a static script antimalware engine 104 that tokenizes, normalizes and generates statistics 105 about the script. The original source file is checked for malware using static signatures 106. This method is effective and sufficient for detecting simple, non-obfuscated or non-polymorphic malware scripts.

If malware is not detected, emulation decision logic 108 decides whether to perform emulation, which may be explicitly specified for the particular script, or may be based on the statistics/heuristics developed during the static scanning. The statistics and/or heuristics are dynamically updatable during emulation runtime.

As will be understood, the process is based upon parameterized heuristics that determine when to invoke emulation on a script sample based on characteristics of that sample. In one implementation, there are defined heuristic classes, and further classes may be added, removed or adjusted in relative weighting through signature updates. An example heuristic is based on the presence and frequency of incidence of certain language and runtime features in the script sample to be scanned. Others include heuristics based on metadata from earlier scanning engine passes, and various qualities of strings and static data in script samples.

Thus, the static scanner engine 104 can detect malware itself, or via the emulation decision logic 108 may dismiss the script as clean or choose to pass it on to a second, emulation stage. As can be readily appreciated, emulation takes time and consumes resources, and thus the decision is based upon tradeoffs in detection accuracy versus system performance.

When invoked, the script emulator (which includes or is coupled to a parser 112 and interpreter 114) parses the script and forms a suitable data structure such as an AST (abstract syntax tree), which is evaluated against generic and static signatures for malicious content.

The script is emulated by interpreting the data structure, with a runtime environment being implemented and updatable via signatures. Other parameters and limits of the emulation runtime environment may be set, and are updateable via signatures such as limits, global values and others. Emulation-based signatures are checked for matches at various points of emulation.

If malware is not detected, re-run logic 116 determines whether a further iteration is to be performed, e.g., based on processing a simplified script referred to as a sub-script. As described below, the re-run logic makes this determination based upon one or more retrieved parameters (which are updateable via signatures) and information in the script (or sub-script), with each subsequent iteration corresponding to a more and more simplified (e.g., more de-obfuscated) sub-script until malware is detected or the re-run logic decides that no further scanning is to be performed.

Figure 2:
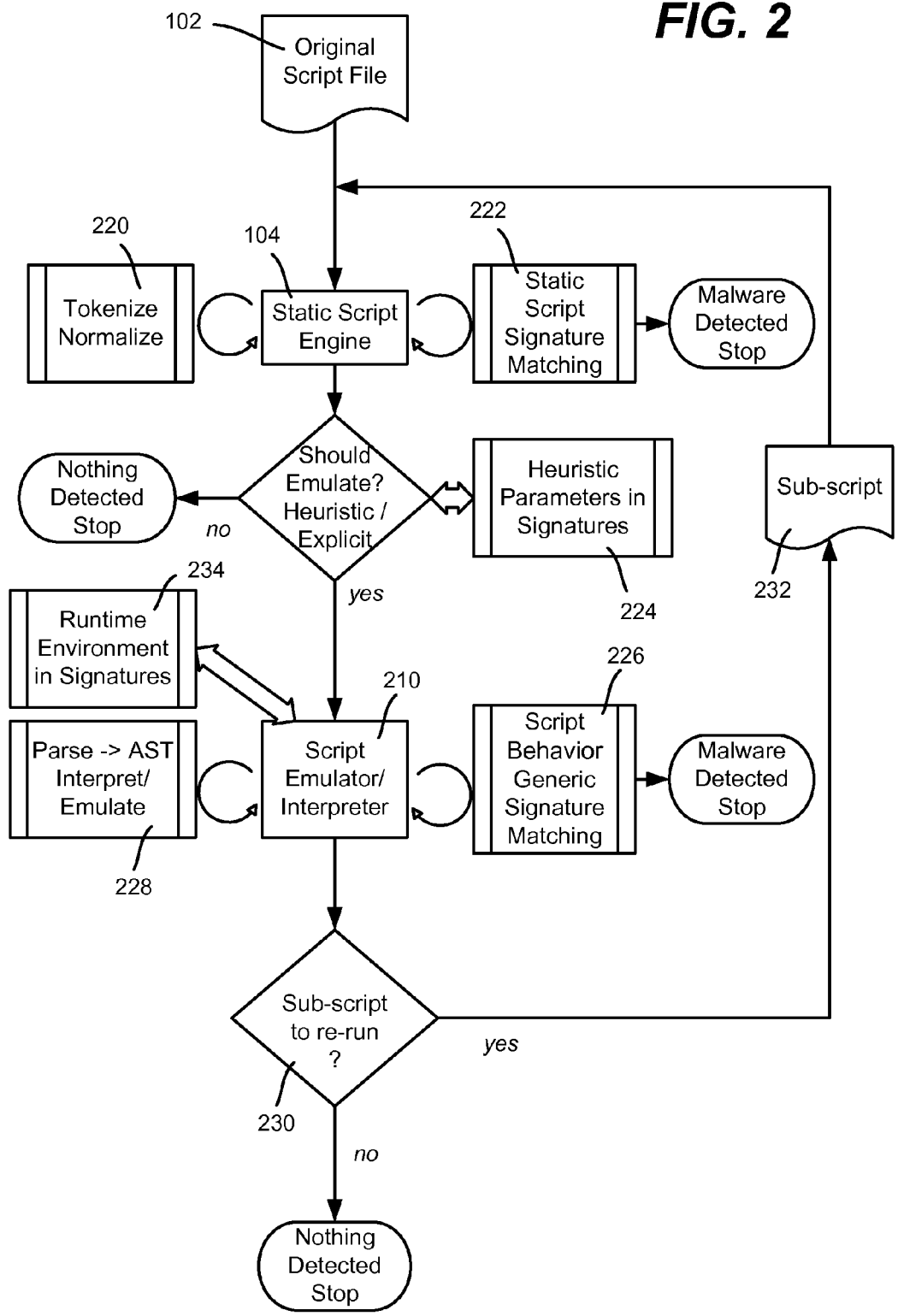
FIG. 2 is an example representation of an implementation in which heuristic analysis, emulation and iterative processing may used to detect script-based malware.

FIG. 2 provides additional details in one example implementation, in which the original script file 102 is fed to the static script engine 104 as a virtual file object. As is known in static scanning, a parser (block 220) breaks up the script file into tokens, including explicit and generic representations. While parsing, various normalization passes are made over the script source to reduce the impact of minor differences between script variants, e.g., changed variable names, whitespace in scripts and the like.

The static script engine 104 may detect malware via static script signature matching 222 at this stage. Note however that contemporary script malware tends to be obfuscated in a manner that cannot be practically addressed via static means, and thus emulation may be performed to detect malware In one aspect, the parsing, tokenization and/or normalization generates a set of statistics (examples of which are described below) that provide data for heuristic methods to trigger script emulation/interpretation/de-obfuscation, as generally represented via block 224 in FIG. 2. The statistics and heuristics rules are dynamic and can be updated during runtime. Generic and static signatures may be matched based upon the structure and content of the parsed program tree of the script, and/or based upon events triggered by the behavior of the script during emulation. Note that in other systems, any heuristic analysis is performed during emulation, which is costly; the technology described herein performs the analysis before any emulation to decide whether the script contains obfuscation, and thus whether to emulate or not, which avoids the cost of emulation when not needed. Note that emulation also may be explicitly set for a file.

When run, the script emulator/interpreter (module 210) parses the script and forms an abstract syntax tree, which is evaluated against the generic (and static) signatures 226 for malicious content. More particularly, as represented in FIG. 2 via block 228, the parser firstly tokenizes the script and parses it into a program tree. Various (e.g., static) optimizations may also be made to the tree before it is passed to the interpreter.

More particularly, for script interpretation, a parser generator may be used to create the script parser. In one implementation, the parser generator uses a grammar based upon parsing expression grammars (PEG). The parser uses recursive descent with infinite look ahead; (note that while this implies potentially exponential time performance, through the use of memoization the worst case performance is close to linear). The parser generates a parse tree which in turn is translated into an abstract syntax tree.

The abstract syntax tree is then interpreted, e.g., directly by the script emulator/interpreter module 210, (in contrast to going to a byte code compiler and virtual machine). In other words, rather than converting the abstract syntax tree into an intermediate form, the interpreter works directly with the abstract syntax tree produced by the parser. To this end, the module 210 may employ a suitable runtime library to assist it in executing the script. While interpreting the script, script-level-behavior generic signatures are checked for matches against the execution flow of the script; for example, a specific sequence of script functions called may trigger a signature.

To properly detect malicious scripts, the emulator needs to accurately represent the runtime environment provided by the host in which the script is expecting to run, for example a web browser. However, a web browser is a relatively large and complicated piece of software that cannot be fully reproduced within an antimalware engine while maintaining high speed performance. At the same time, any inaccuracies may render the behavioral analysis ineffective, and thus the chosen subset of functionality allows accurate analysis while remaining fast. With respect to updatable runtime environments, the interpreter supports multiple runtime environments such as a web browser's DOM or a PDF viewer's script runtime. The objects and built in functions of such runtimes are updatable via antimalware signature updates. The runtime behavior can also be controlled and dynamically updated during the emulation.

The first round of script antimalware processing, including emulation, will not necessarily detect malware that exists, e.g., due to the way in which the malware is obfuscated. For example, if a string is passed by the script to a monitored function call, then that content may still correspond to malware, as described below. Note that a list of functions to monitor may be maintained in the signatures, and thus is updateable.

If malware was not detected, another round may be performed, as represented by decision block 230. To this end, any such string may be placed into a sub-script 230 (a new virtual file object), and the process repeated for child sub-script virtual file objects, recursively. In this way, the antimalware system is able to "see through" obfuscation layers, allowing for generic detection of less-frequently changing malicious payload underneath.

In one aspect, there is described extending and updating the runtime emulation environment via signatures, (block 234), without requiring a change to the core emulator or the antimalware engine. The emulation environment may thus evolve over time, with multiple environments supported via signatures. Also described is the ability to dynamically change the behavior of the runtime during the emulation based on other aspects of emulation.

Malware detection may be done by heuristic analysis of runtime behavior and potentially by simple pattern matching on script output. Scripts also may drop other scripts (most likely un-obfuscated versions of themselves) and these are in turn queued and scanned by the engine.

With respect to signature detection, in one implementation the heuristic evaluation is parameterized with stored values, (e.g., in the signature database), which allows for adjustment of how often scripts are emulated, what causes them to be emulated, for how long and to what depth they are emulated. This filtering is implemented as a performance consideration, as it causes the early rejection of non-malicious scripts from being interpreted further. Alternatives included emulating all scripts, or emulating based on simple static rules rather than updateable heuristics.

Multistage signature matching after 'rounds' of emulation also may be implemented in another way, e.g., by checking for these signatures at different points or at the end of emulation only. The generic behavioral signature matching based on the sequence of script function calls may comprise one method of signature matching on script files.

Turning to example statistics, as described above a heuristic evaluation is performed on the statistics to determine whether the script is to be emulated, which is based on whether there is a significant suspicion that it is maliciously obfuscated. One set of statistics are directed towards string manipulation functions. The number of times these are called for a given script may be tracked, and an overall number determined. Note that almost every non-trivial obfuscation technique uses a string object; generally obfuscation involves hiding the actual malware by encoding it, breaking it up, and so forth, and then decoding or recombining it, which typically involves the use of string manipulation functions. Other types of statistics may be based on common behaviors and/or other features that are observed by studying known malware.

Figure 3:
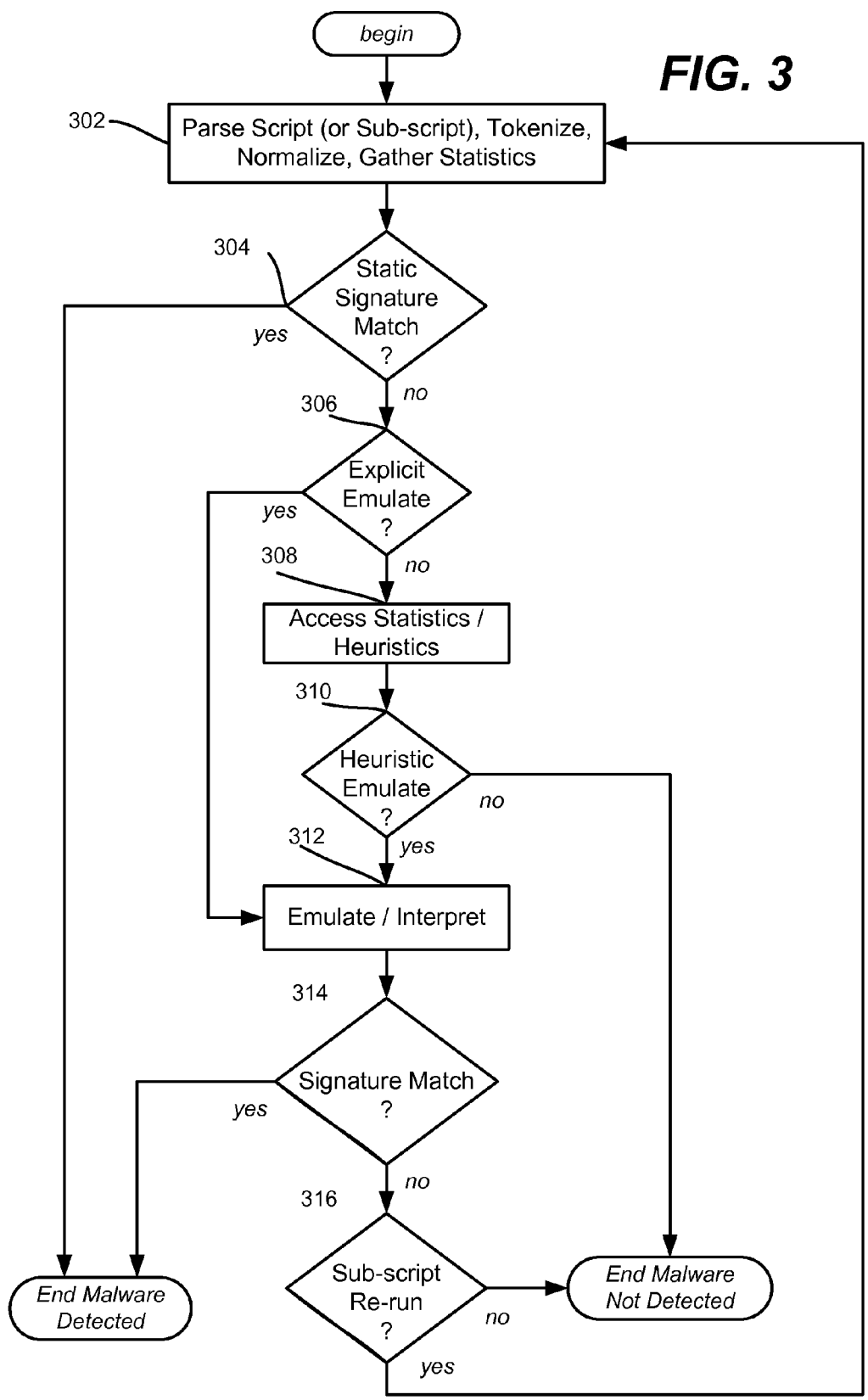
FIG. 3 is a flow diagram representing example steps for detecting script-based malware using emulation and heuristics.

FIG. 3 summarizes one example process comprising the emulation-enabled runtime, beginning at step 302 where the script is parsed, tokenized, normalized and statistics gathered. Step 304 represents the static signature matching, which ends the process if malware is detected.

If not, step 306 checks for whether the script is explicitly set for emulation, e.g., based upon the attributes. As described above, specifically enabling (or disabling, not shown) of the emulator is possible via setting attributes in signatures. If so, step 306 branches to step 312 where emulation is performed.

Otherwise step 304 branches to step 308 for the purpose of determining via heuristics whether to emulate. Note that for efficiency, if a script is explicitly set for emulation, the statistics need not be collected; also, at least some statistics may be collected following the static signature match to reduce the cost when malware is statically detected.

Steps 308 and 310 represent using heuristics to determine whether or not the emulator should be invoked for a given script. The emulation pass (step 312) causes performance degradation, and thus invocation is avoided unless there is appropriate level of suspicion that the given script may be malicious; as described above, the determination is made via statistics gathered during the normal script scanning pass. Step 314 represents the signature matching performed during emulation.

If malware is not detected, step 316 determines whether to re-run the process on a sub-script. In one implementation, it is only desired to re-queue new virtual file objects for subsequent passes when encountering certain function calls, that is, those listed to be monitored.

As can be seen, there is described matching generic and static signatures by interpreting the structure and content of the parsed program tree of the script, and by matching generic and static signatures on events triggered by the behavior of the script during emulation. The runtime emulation environment is updatable (including extendable) by updating via signatures, without requiring a change to the core emulator or the antimalware engine. The emulation environment may thus evolve over time, and multiple environments are supported via signatures.

In one aspect, the behavior of the runtime may be dynamically changed during the emulation based on other aspects of emulation. Heuristic analysis of the script sample may be used to identify obfuscated or possibly malicious content, to determine when to invoke emulation. Tokenization, normalization and parsing of a script generate a set of statistics, which provide data for heuristic methods to trigger script emulation/interpretation/de-obfuscation. The statistics and heuristics rules are dynamic and can be updated during run-time.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 4:
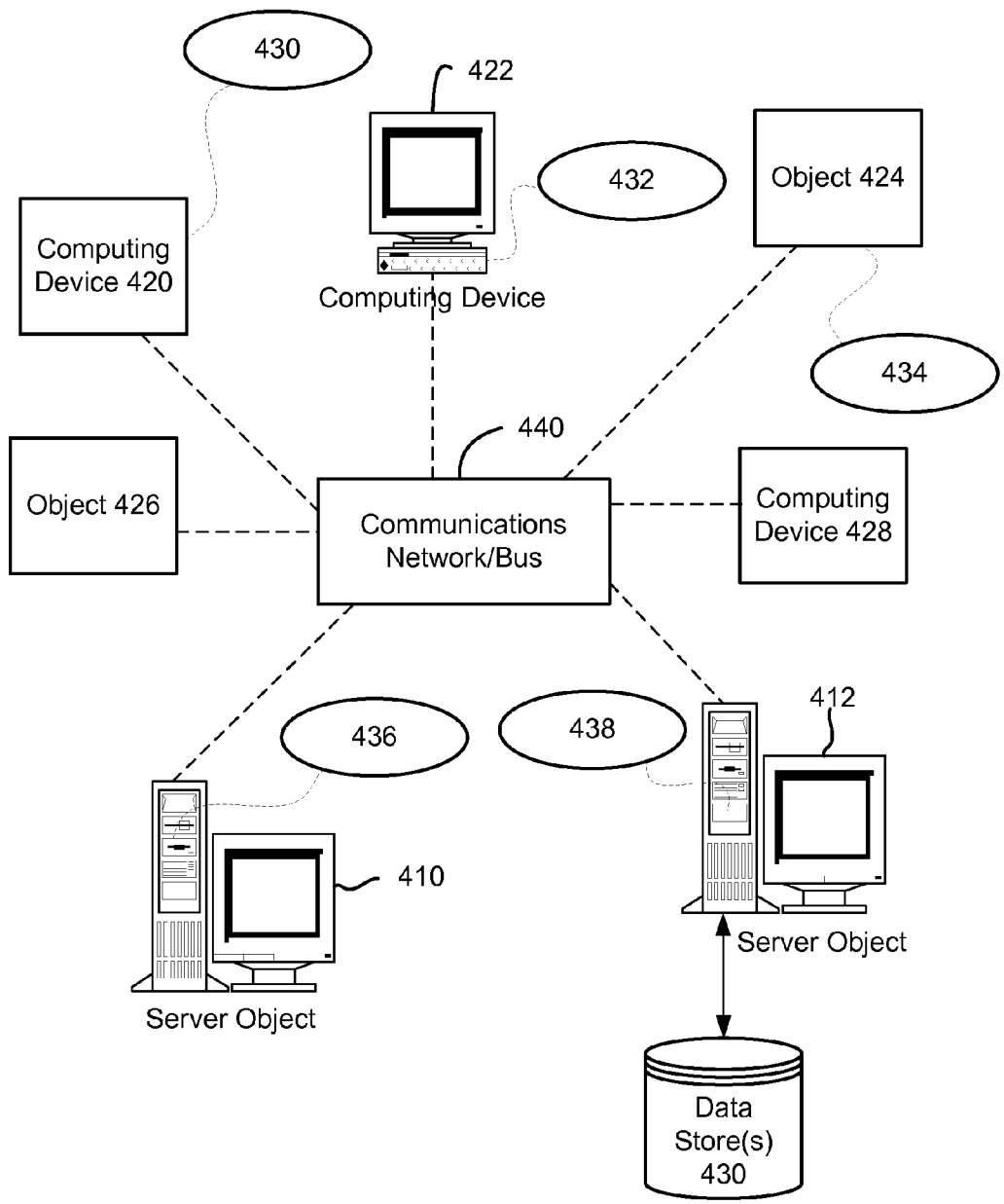
FIG. 4 is a block diagram representing exemplary non-limiting networked environments in which various embodiments described herein can be implemented.

FIG. 4 provides a schematic diagram of an exemplary networked or distributed computing environment. The distributed computing environment comprises computing objects 410, 412, etc., and computing objects or devices 420, 422, 424, 426, 428, etc., which may include programs, methods, data stores, programmable logic, etc. as represented by example applications 430, 432, 434, 436, 438. It can be appreciated that computing objects 410, 412, etc. and computing objects or devices 420, 422, 424, 426, 428, etc. may comprise different devices, such as personal digital assistants (PDAs), audio/video devices, mobile phones, MP3 players, personal computers, laptops, etc.

Each computing object 410, 412, etc. and computing objects or devices 420, 422, 424, 426, 428, etc. can communicate with one or more other computing objects 410, 412, etc. and computing objects or devices 420, 422, 424, 426, 428, etc. by way of the communications network 440, either directly or indirectly. Even though illustrated as a single element in FIG. 4, communications network 440 may comprise other computing objects and computing devices that provide services to the system of FIG. 4, and/or may represent multiple interconnected networks, which are not shown. Each computing object 410, 412, etc. or computing object or device 420, 422, 424, 426, 428, etc. can also contain an application, such as applications 430, 432, 434, 436, 438, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 4, as a non-limiting example, computing objects or devices 420, 422, 424, 426, 428, etc. can be thought of as clients and computing objects 410, 412, etc. can be thought of as servers where computing objects 410, 412, etc., acting as servers provide data services, such as receiving data from client computing objects or devices 420, 422, 424, 426, 428, etc., storing of data, processing of data, transmitting data to client computing objects or devices 420, 422, 424, 426, 428, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 440 or bus is the Internet, for example, the computing objects 410, 412, etc. can be Web servers with which other computing objects or devices 420, 422, 424, 426, 428, etc. communicate via any of a number of known protocols, such as the hypertext transfer protocol (HTTP). Computing objects 410, 412, etc. acting as servers may also serve as clients, e.g., computing objects or devices 420, 422, 424, 426, 428, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 5 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 5:
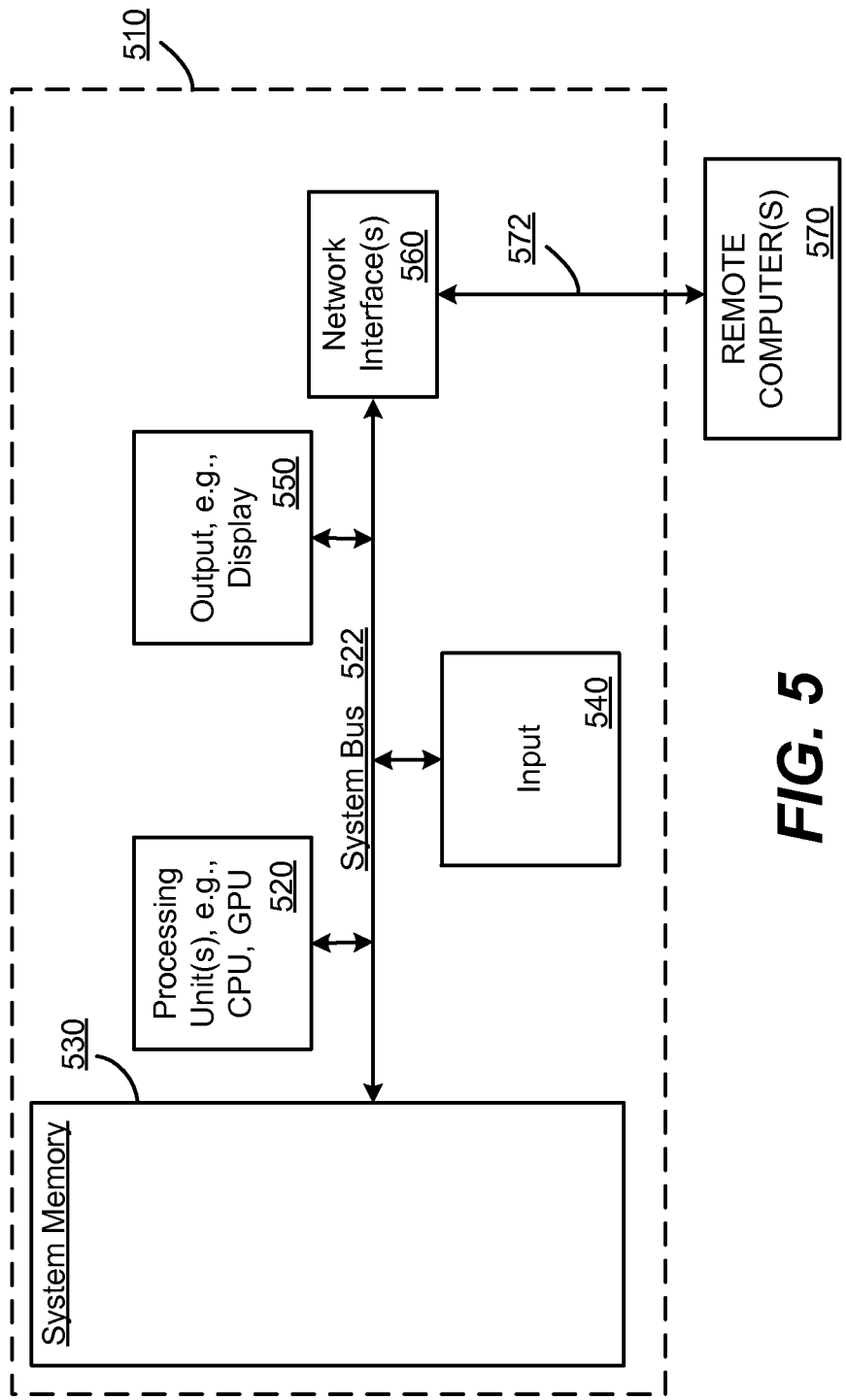
FIG. 5 is a block diagram representing an exemplary non-limiting computing system or operating environment in which one or more aspects of various embodiments described herein can be implemented.

FIG. 5 thus illustrates an example of a suitable computing system environment 500 in which one or aspects of the embodiments described herein can be implemented, although as made clear above, the computing system environment 500 is only one example of a suitable computing environment and is not intended to suggest any limitation as to scope of use or functionality. In addition, the computing system environment 500 is not intended to be interpreted as having any dependency relating to any one or combination of components illustrated in the exemplary computing system environment 500.

With reference to FIG. 5, an exemplary remote device for implementing one or more embodiments includes a general purpose computing device in the form of a computer 510. Components of computer 510 may include, but are not limited to, a processing unit 520, a system memory 530, and a system bus 522 that couples various system components including the system memory to the processing unit 520.

Computer 510 typically includes a variety of computer readable media and can be any available media that can be accessed by computer 510. The system memory 530 may include computer storage media in the form of volatile and/or nonvolatile memory such as read only memory (ROM) and/or random access memory (RAM). By way of example, and not limitation, system memory 530 may also include an operating system, application programs, other program modules, and program data.

A user can enter commands and information into the computer 510 through input devices 540. A monitor or other type of display device is also connected to the system bus 522 via an interface, such as output interface 550. In addition to a monitor, computers can also include other peripheral output devices such as speakers and a printer, which may be connected through output interface 550.

The computer 510 may operate in a networked or distributed environment using logical connections to one or more other remote computers, such as remote computer 570. The remote computer 570 may be a personal computer, a server, a router, a network PC, a peer device or other common network node, or any other remote media consumption or transmission device, and may include any or all of the elements described above relative to the computer 510. The logical connections depicted in FIG. 5 include a network 572, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a computer-implemented method performed at least in part on at least one processor, the method comprising:
    scanning a script sample with a static engine by:
        processing the script sample for malware detection, the static engine configured to detect malware using one or more static signatures;
        based on the static engine not detecting malware in the script sample, determining, before an emulation, a need for the emulation; and
        detecting any malware in the script sample by:
            running the script sample in the emulation; and
            analyzing events during the emulation.

2. The computer-implemented method of claim 1, wherein determining a need for an emulation is based upon statistics developed from the scanning of the script sample with the static engine.

3. The computer-implemented method of claim 1 further comprising, determining whether to invoke an emulator to perform the emulation in the emulation environment based on an heuristic analysis of the script sample.

4. The computer-implemented method of claim 3 further comprising, generating statistics for the heuristic analysis via tokenization, normalization and parsing of the script sample.

5. The computer-implemented method of claim 1 further comprising, placing content corresponding to the script sample into a sub-script, and processing data corresponding to the sub-script in an emulation environment of the emulator by one or more of the following: analyzing structure and content of a data structure corresponding to the sub-script to match against generic and static signatures of malware; analyzing events triggered during emulation against generic and static signatures of malware, or both, to detect whether the sub-script comprises malware.

6. The computer-implemented method of claim 1, wherein the emulator represents a runtime environment provided by a portable document format (PDF) viewer.

7. The computer-implemented method of claim 2 further comprising, updating a runtime emulation environment of the emulator via one or more signatures in association with performing of the emulation.

8. The computer-implemented method of claim 1, wherein the script sample includes obfuscated script, and wherein the emulation detects malware configured to evade detection by the static engine.

9. The computer-implemented method of claim 1, wherein the script sample includes polymorphic script, and wherein the emulation detects malware configured to evade detection by the static engine.

10. The computer-implemented method of claim 1, wherein the emulator represents a runtime environment provided by a web browser.

11. The method of claim 10, wherein the runtime environment parses a Document Object Model (DOM).

12. In a computing environment, a system comprising:
    a memory comprising computer useable program code; and
    one or more processing units configured to execute the computer useable program code to provide for:
        a static script engine configured to scan a script sample for malware detection and to detect malware using one or more static signatures;
        an emulator; and
        decision logic configured to invoke the emulator based on the static script engine not detecting malware in the script sample, the emulator configured to detect any malware in the script sample by running the script sample in an emulation, and by analyzing events during emulation.

13. The system of claim 12 wherein the decision logic is configured to determine whether to invoke the emulator based at least on result from the scanning of the script sample with the static engine.

14. The system of claim 12 wherein the emulation represents a runtime environment provided by a portable document format (PDF) viewer.

15. The system of claim 12, wherein the script sample includes obfuscated script, and wherein the emulation detects malware configured to evade detection by the static engine.

16. The system of claim 12, wherein the script sample includes polymorphic script, and wherein the emulation detects malware configured to evade detection by the static engine.

17. The system of claim 12, wherein the emulator represents a runtime environment provided by a web browser.

18. One or more computer storage devices having computer-executable instructions, which based on execution by one or more processors configure the one or more processors to:
    scan a script sample by processing the script sample for malware detection using one or more static signatures;
    determine a need for an emulation based on the processing of the script sample not detecting malware; and
    further processing the script sample to detect any malware in the script sample by:
        detecting any malware in the script in the emulation; and
        analyzing events during the emulation.

19. The one or more computer storage devices of claim 18 wherein determining a need for an emulation is based upon statistics developed from the scanning of the script sample with the static engine.

20. The one or more computer storage devices of claim 18 having further computer-executable instructions comprising updating a runtime emulation environment of the emulator via one or more signatures in association with performing of the emulation.

* * * * *